July 2, 1946.  G. E. ARMINGTON  2,403,325
BOOSTER STEERING DEVICE
Original Filed Feb. 4, 1942  3 Sheets-Sheet 1

INVENTOR
GEORGE E. ARMINGTON
BY
*Hyde and Meyer*
ATTORNEY

July 2, 1946.   G. E. ARMINGTON   2,403,325
BOOSTER STEERING DEVICE
Original Filed Feb. 4, 1942   3 Sheets-Sheet 2
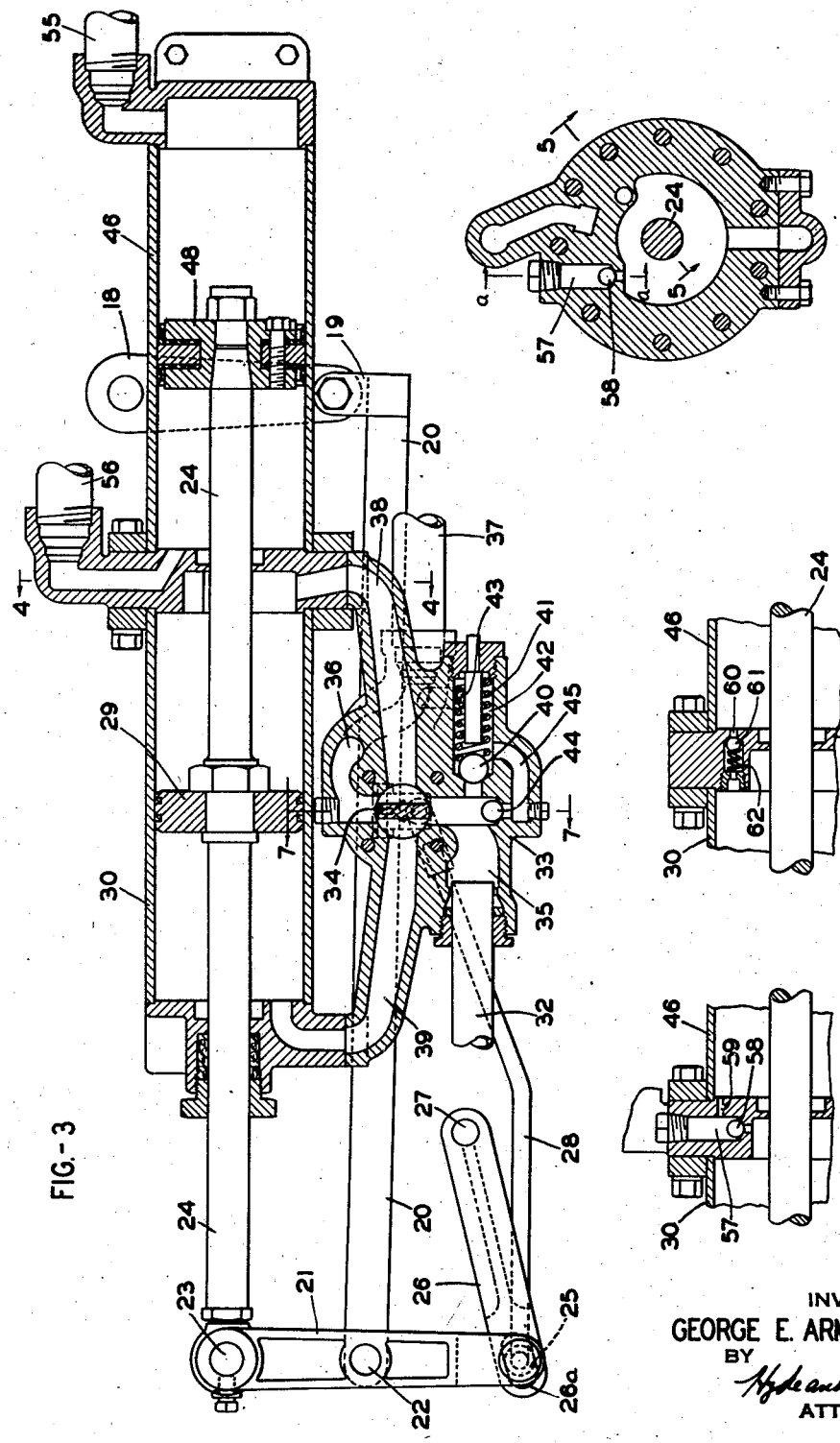
INVENTOR
GEORGE E. ARMINGTON
BY
Hyde and Meyer
ATTORNEYS July 2, 1946.  G. E. ARMINGTON  2,403,325
BOOSTER STEERING DEVICE
Original Filed Feb. 4, 1942   3 Sheets-Sheet 3
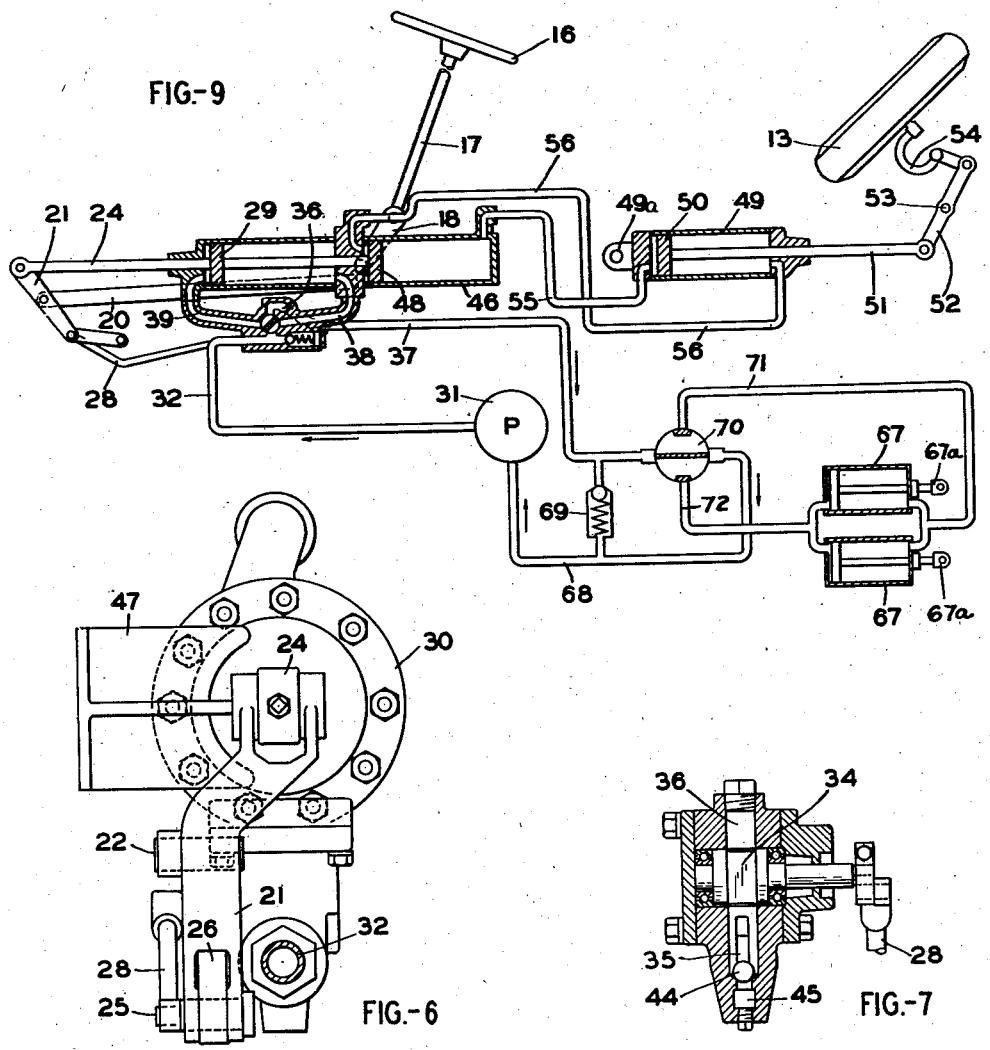
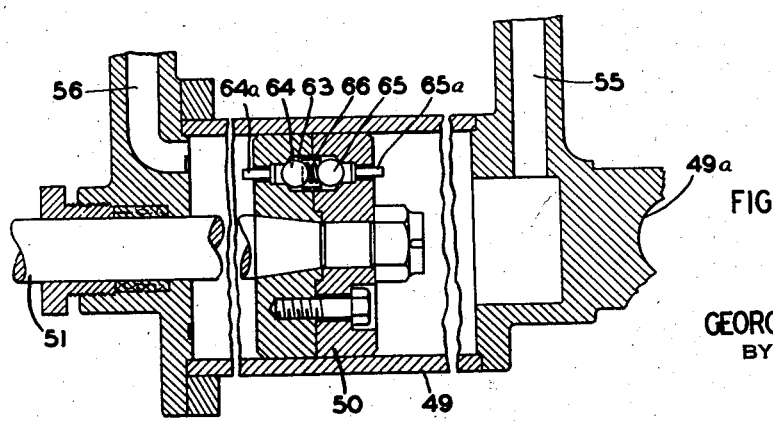
INVENTOR
GEORGE E. ARMINGTON
BY
Hyde and Meyer
ATTORNEYS Patented July 2, 1946

2,403,325

UNITED STATES PATENT OFFICE 2,403,325

BOOSTER STEERING DEVICE

George E. Armington, South Euclid, Ohio, assignor to The Euclid Road Machinery Co., Euclid, Ohio, a corporation of Ohio Continuation of application Serial No. 429,557, February 4, 1942. This application April 9, 1945, Serial No. 587,365

14 Claims. (Cl. 180—79.2)

This invention relates to improvements in power steering devices of the type wherein the usual steering member is operated to effect movement of a lead valve which places in operation a booster device which normally takes over most of the heavy work connected with the movement of the parts to be steered.

This application is a continuation of my earlier application for Booster steering device, Serial No. 429,557, filed February 4, 1942.

One of the features of the present invention is the provision of a cylinder and piston booster motor with valve mechanism for operating the same which is adapted to be operated by the differential pressure exerted between the inlet and outlet of the device so that a moving stream of oil or other pressure fluid impelled by a pump may traverse the booster device and pass on to other fluid actuated power mechanism on the vehicle to perform other work before returning to the pump.

Another object of the present invention is to provide a device of the type described wherein provision is made for relief of excessive pressure if such should occur and provision is also made for relief of pressure from the hydraulic system generally if it is necessary to operate the steering device by hand in the case of failure of the pump to supply sufficient pressure for power steering.

Another object of the present invention is to provide improvements in remote controlled steering devices of this sort wherein the parts of a secondary system move in response to the parts of a primary system which in turn are directly under the control of the usual vehicle steering member. This permits the placing of the parts in the secondary system at the most convenient point for operating the parts of the vehicle which must be moved to steer the same. In such remote controlled steering devices the present invention provides means for keeping the secondary system filled with pressure fluid at all times, means for preventing the production of excessive pressures in the secondary system, and means for synchronizing the movement of the parts in the secondary system with the parts in the primary system.

Other novel features and advantages of my improved device will be apparent from the accompanying drawings and description, and the essential features thereof will be set forth in the claims.

In the drawings:

Fig. 3 is an enlarged central vertical section through the double cylinder device seen at the left in Fig. 1;

Fig. 4 is a transverse sectional view taken along the line 4—4 of Fig. 3;

Fig. 4a is a fragmental sectional view taken along the line a—a of Fig. 4;

Fig. 5 is a fragmental sectional view taken along the line 5—5 of Fig. 4;

Fig. 6 is an end elevational view taken from the left end of Fig. 3;

Fig. 7 is a sectional view taken along the line 7—7 of Fig. 3;

Fig. 8 is an enlarged central horizontal section through the cylinder at the right-hand end of Fig. 1; while Fig. 9 is a diagrammatic view of the hydraulic system as a whole.

Figure 1:
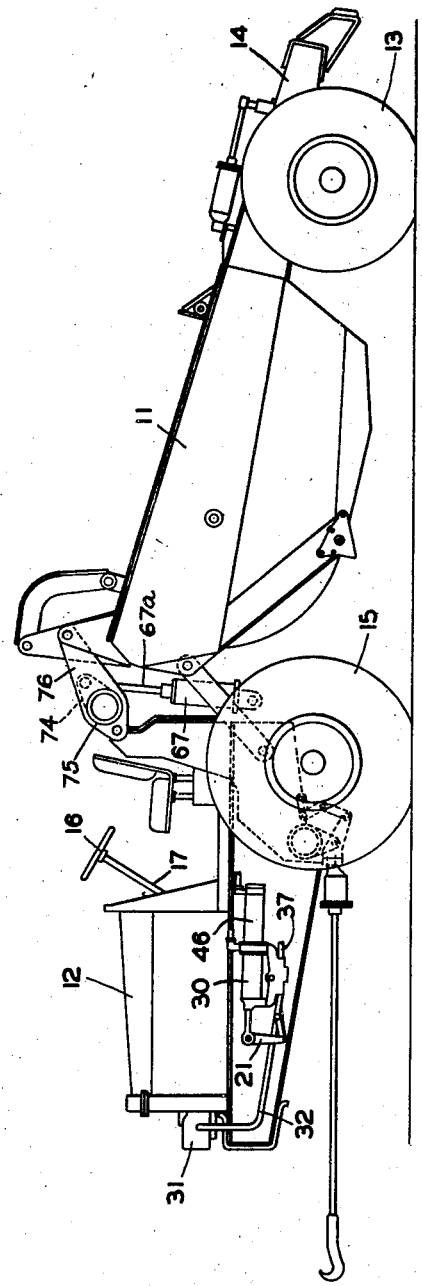
Fig. 1 is a side elevation of a scraper equipped with my improved steering device.

It will be understood by those skilled in this art that my improved steering device may be applied to many different types of vehicles but for the purposes of the present description it has been shown as applied to a carrying scraper having a bowl 11 whose front end is supported by a tractor 12 and whose rear end is supported by a pair of steerable wheels 13 suitably mounted on the scraper frame 14. The tractor is provided with an internal combustion engine connected by drive means (not shown) to a pair of drive wheels 15.

The steering device disclosed herein is adapted for operation by the usual vehicle steering member such as the wheel 16 of the tractor. This is connected through the usual steering column 17 with the steering pitman 18 as is well known in this art. A clevis 19 connects the pitman with the drag link 20. The forward end of the drag link is pivotally connected to the secondary pitman arm 21 intermediate the ends thereof by means of the pin 22. The upper end of this secondary pitman arm is pivotally connected at 23 to the forward end of piston rod 24. The lower end of the pitman arm 21 carries a pin 25 which engages in elongated slot 26a of the link 26. This link is pivotally connected at 27 to the frame of the tractor. On the inner end of pin 25 is pivotally mounted the valve control rod 28.

The function of the parts just described is well known in this art and is as follows: When the steering wheel is turned, pitman 18 through drag link 20 causes movement of arm 21 about the pivot 23 which is for the moment fixed. This causes sufficient movement of pin 25 in slot 26a to operate the control valve of the booster steering device by movement of the valve control rod 28. Following movement of this valve the booster steering device moves piston rod 24 and produces movement of the steering wheels 13 as will be presently described until movement of arm 21 about the momentarily fixed pivot 22 again causes centering of pin 25 in the slot 26a, whereupon the valve control rod 28 moves the valve to neutral position and the action of the booster steering device stops.

The power steering is controlled by the cylinder and piston motor comprising piston 29 on rod 24 which reciprocates in cylinder 30. Pressure fluid for operation of this motor is provided from a pump 31 suitably mounted on the frame and preferably driven from the engine of the tractor by means not shown. Pressure fluid passes through conduit 32 to valve body 33. This valve body has a hollow chamber housing a rotatable valve member 34 which in the neutral position shown in Fig. 3 permits the flow of pressure fluid from pipe 32 through the inlet passageway 35, past the valve and through the outlet passageway 36 to the pipe 37.

Two positions of valve 34 are provided for directing the flow of pressure fluid against one or the other of the faces of piston 29 as desired, for steering the vehicle to the left or to the right. One of these positions is shown in Fig. 9 for steering the vehicle to the right. This establishes flow from the inlet pipe 32 to the passage 38 which communicates with the right-hand face of piston 29 as shown in the various views. This will move piston 29 toward the left and cause discharge of fluid from the left-hand end of cylinder 30 through conduit 39 and outlet passage 36. The operating position for valve 34 for turning the vehicle toward the left is substantially at right angles to the position in Fig. 9 and provides communication from inlet pipe 32 through passageway 39 to the left face of piston 29. Fluid then driven from the right end of cylinder 30 will pass through passageway 38 to outlet passageway 36.

Means is provided to relieve excessive pressure on the inlet side of the valve as might occur for instance if the valve were set in one of its operating positions and it was impossible to move the parts. In such case the pump 31 might build up a very high pressure. The means provided for this purpose includes the ball check valve 40 (Fig. 3) which permits flow from the inlet side to the outlet side of the valve 34 only. This ball is loaded by spring 41 which is adjusted to the desired pressure. Upon excessive pressure above this predetermined point the ball 40 will be lifted from its seat against the action of spring 41 and fluid will flow through chamber 42 and passageway 43 which leads to the outlet passageway 36.

Means is provided permitting the comparatively easy steering of the vehicle by hand in case of failure of the pump pressure. This means comprises a ball check valve 44 (Fig. 3) acting by gravity only and permitting flow in one direction only from the outlet side of the valve to the inlet side thereof. This operates in the following manner: In the absence of pump pressure the steering wheel 16 may be turned in the usual manner thus transmitting motion to pitman 18, drag link 20 and arm 21. The lower end of this arm being temporarily fixed the upper end of the arm will be moved thus causing the same movement of rod 24 and piston 29 as though power had been applied. This will produce the desired steering action as will be presently described. However, such action would be almost impossible if the operator of the vehicle had to force the fluid from cylinder 30 through the entire hydraulic system. If for instance the operator is trying to move piston 29 toward the right as viewed in Fig. 3, fluid will be forced through conduit 38, valve 34, passageways 36 and 43, chamber 42, passageway 45, valves 44 and 34 and then through passageway 39 to the left-hand end of cylinder 30. Thus the fluid moves readily through the by-pass 44 and the operator can move piston 29 in either direction by manual operation of steering wheel 16.

The device thus far described could be used for producing a direct steering effect by connecting a steering drag link in any suitable manner to move with rod 24. In the present instance, however, the device is shown adapted to produce a remote controlled steering effect which will now be described.

Figure 2:
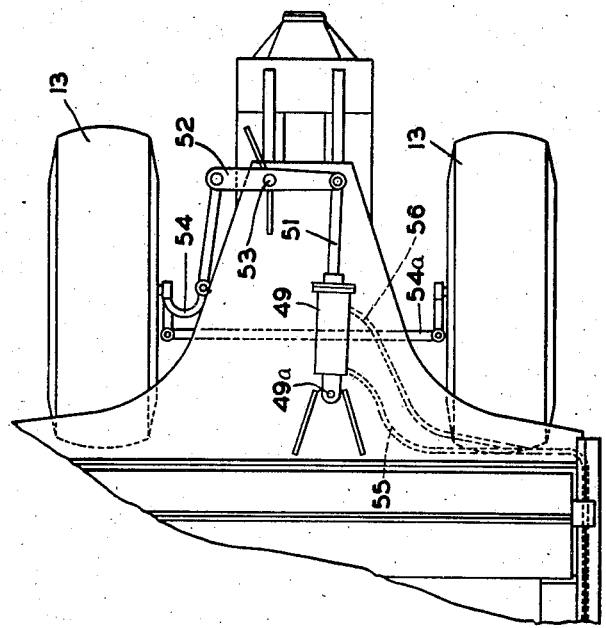
Fig. 2 is an enlarged top plan view of the rear portion of the device of Fig. 1.

The movement of piston 29 in cylinder 30 is utilized to cause the desired flow of a pressure fluid in a secondary system which in turn is directly connected to apparatus for steering wheels 13. In the form shown here a cylinder 46 is mounted in line with cylinder 30 and both of these cylinders are suitably mounted on the tractor frame by means of one or more brackets 47. Piston 48 is mounted rigidly on rod 24 for reciprocation in cylinder 46. The steering motor comprises a cylinder 49 having a swivel mounting 49a on the rear scraper frame 14 and provided with a reciprocating piston 50 whose piston rod 51 is pivotally connected with a lever 52 which in turn is pivotally mounted at 53 on the frame 14. The other end of lever 52 is connected with steering arm 54 for movement of wheel 13 which is properly mounted on a stub axle and kingpin as is usual in such cases. The arm 54 of Fig. 2 connects with the other wheel 13 through a link 54a. The rear end of cylinder 46 is connected by conduit 55 with the forward end of cylinder 49. The forward end of cylinder 46 is connected by conduit 56 with the rear end of cylinder 49. It is evident therefore that movement of piston 48 rearwardly or toward the right as viewed in Figs. 3 and 9 will cause rearward movement of piston 50 by forcing fluid from the rear end of cylinder 46 through conduit 55 to the forward end of cylinder 49. At the same time the fluid forced out of the rear end of cylinder 49 will pass through conduit 56 to the forward end of cylinder 46. Thus piston 50 follows the movements of piston 48.

A passageway 57 (Fig. 4) normally closed by the gravity ball check valve 58 provides a passageway from cylinder 30 through a bore 59 to the secondary system as shown in Fig. 4a permitting flow from the primary system to the secondary system only. This insures that the secondary system is at all times filled with fluid and prevents lost motion between the primary pistons 29, 48 and the secondary piston 50.

If excessive pressure builds up in the secondary system it is relieved through passageway 60 (Fig. 5) in the partition wall 30a between cylinders 30 and 46. This passageway is normally closed by the ball check valve 61 loaded by spring 62 and permitting flow in one direction only from the secondary system toward the primary system if excessive pressure builds up in the secondary system as would occur for instance if the steering wheels were held against movement when the apparatus was attempting to steer them.

Means is provided in piston 50 whereby the movement of pistons 48 and 50 may be synchronized. As shown in Fig. 8, a passageway 63 extends clear through piston 50. In this passageway are provided ball check valves 64 and 65, one permitting flow in one direction only and the other permitting flow in the opposite direction only. These valves are normally held to their seats by the spring 66. A plunger 64a of valve 64 will strike the rear head casting of the cylinder when the piston reaches the rear end of its travel so as to lift ball 64 from its seat. In a like manner a plunger 65a of valve 65 will strike the forward head casting of the cylinder when the piston reaches the forward end of its travel so as to lift ball 65 from its seat. It results from this construction that as piston 50 in Fig. 8 moves to the right end of its stroke, the plunger 65a will lift valve 65 from its seat slightly, and thereafter if excess pressure builds up on the left-hand face of piston 50, the pressure fluid will lift valve 64 from its seat and fluid will be by-passed from conduit 56 through the piston to conduit 55. Whenever necessary to synchronize the position of pistons 48 and 50 it is only necessary therefore to run piston 48 to one end of its stroke and to hold it there until piston 50 reaches the end of its stroke and by-passes the flow of fluid through valve 64 or 65 when both pistons 48 and 50 cease their movement at corresponding ends of their respective cylinders. Thereafter the pistons occupy similar positions in their cylinders and the steering can proceed as described.

It is obvious now that movement of piston 29 following the manipulation of steering wheel 16 will be followed by similar movement of pistons 48 and 50 and the wheels 13 will be steered right or left or straight forward as desired by the operator of the tractor.

As mentioned earlier, this power steering device operates on a differential pressure of the stream flowing from pump 31. That is to say, sufficient pressure from this flowing stream is utilized to move piston 29 and the stream after accomplishing this work flows through conduit 37 and is available for further work. For instance conduit 37 may be connected to cylinders 67 through suitable control valves as for instance in a system shown in the copending application of Raymond Q. Armington and myself, Serial Number 333,526, filed May 6, 1940, now Patent Number 2,335,231, dated November 30, 1943. Referring to Fig. 1, two parallel cylinders 67 acting through their piston rods 67a oscillate crank arms 74, torque rod 75 and crank arms 76 to raise and lower the forward end of the body 11 relative to the tractor 12. Referring to Fig. 9 if valve 70 is turned 45 degrees counter-clockwise from the position shown, pressure fluid will flow from conduit 37 through conduit 71 to move the pistons in motor 67 toward the left, thus causing liquid driven before the pistons to pass through conduit 72, valve 70 and conduit 68 back to the pump. After performing this additional work the pressure fluid may then return to pump 31 through conduit 68. Excess fluid in the system connected to lines 37 and 68 may return to the pump through check valve 69. I have thus provided a means whereby a single pump may be utilized for producing power steering of a vehicle through the utilization of a portion of the pressure of the fluid stream and thereafter the residual energy in the fluid stream may be utilized in other power devices to do other work connected with the operation of the vehicle.

The system herein disclosed operates satisfactorily with a pump 31 of either large or small volume. Any desired volume of fluid may flow through the booster steering device to the hydraulically operated device beyond it. The only limitation on such flow is the size of ports in valve 34.

The fact that there is a large volume of oil or the like passing through the steering device tends to provide stability to the steering apparatus because a certain head of oil pressure is exerted on each face of piston 29 and this tends to eliminate shimmy and takes the shock off the steering gear.

Heavy back pressure in the line 37 does not seriously affect the operation of the booster steering device as long as the total pressure required is within the capacity of the pump 31. This is true because the steering device operates on the differential in pressure between the incoming fluid in pipe 32 and the outgoing fluid in pipe 37.

It will be understood by those skilled in this art that the device here disclosed is equally useful in other types of vehicles. For instance the device might be used to steer a dump truck wherein a cylinder similar to that illustrated at 67 might be used for producing dumping action of the body.

What I claim is:

1. A self-contained unitary power operating system for a vehicle having a steering member, comprising a cylinder and piston motor, an operating connection from said motor to said steering member, a fluid operated power device on said vehicle, a pump, a pressure fluid conduit connection from the discharge side of said pump to one face of said piston, a pressure fluid conduit connection from the other face of said piston to said fluid operated power device, and a fluid connection from said fluid operated power device to the intake side of said pump, whereby fluid from said pump may be utilized in said cylinder and piston motor for steering and the fluid discharged from said other face of said piston during said motor operation may be utilized in said power device.

2. Steering means for a vehicle having steerable wheel means comprising a cylinder and piston motor operatively connected with said wheel means for steering the latter, an operator controlled vehicle steering member, a cylinder and piston motor, a primary pressure fluid supply system, valve means for directing fluid from said system selectively to opposite faces of the piston of said last named motor, an operative connection between said steering member and said valve for positioning the latter, a third cylinder and piston device movable in response to movements of said second named motor, a closed fluid system including said first named motor and said third device and including a conduit connecting one end of said first motor with one end of said device and a conduit connecting the other end of said first motor with the other end of said device, whereby fluid moved by said device will be forced to said first motor to actuate the same.

3. The combination of claim 2 including valve controlled by-pass means associated with said first named motor and permitting fluid flow from one side to the other side of said piston of said first named motor, and means opening said by-pass means by relative approach between said piston and either end of said cylinder of said first named motor near the end of a stroke in either direction.

4. The combination of claim 2 including a by-pass between said closed fluid system and said primary fluid supply system, valve means in said by-pass permitting flow toward said primary system only, and means biasing said valve toward closed position.

5. The combination of claim 2 including a by-pass between said closed fluid system and said primary fluid supply system, and easily openable valve means in said by-pass permitting flow toward said closed system only.

6. A self-contained power operating system for a vehicle having a steering member, comprising a first cylinder and piston motor, an operating connection from said motor to said steering member, a power device on said vehicle, a second cylinder and piston motor operatively connected with said power device, a pump, a pressure fluid conduit connection from the discharge side of said pump to one face of the piston of said first motor, a pressure fluid conduit connection from the other face of the piston of said first motor to one face of the piston of said second motor, and a fluid conduit connection from the other face of the piston of said second motor to the intake side of said pump, whereby the pressure of fluid from said pump may be utilized in said first motor for steering and the fluid discharged from said other face of the piston of said first motor during said first motor operation may be utilized in said power device.

7. In a device of the class described, the combination of a double-acting cylinder and piston motor, a pump, a pressure fluid supply connection from the discharge side of said pump to said motor, valve means for selectively connecting said pressure fluid supply to either one of the ends of said motor to operate it in one direction or the other, a discharge conduit for the reception of pressure fluid from the other end of said motor set in motion by advancing movement of the piston of said motor when operated, said valve means having two motor-operating positions in either of which it connects the other end of said motor with said discharge conduit, said valve means having a neutral position permitting fluid flow directly from said supply to said discharge conduit, steering means for turning said valve means, mechanism connected with said valve means and with said motor for automatically returning said valve means to neutral position by motor movement, and a fluid power device connected with said discharge conduit, whereby said power device may be operated in all positions of said valve means.

8. Steering means for a vehicle having steerable wheel means, comprising a motor having cylinder and piston members one of which is movable, connecting means between said movable member and said steerable wheel means, a lever, an operative connection between said movable member and one end of said lever for moving said one end to follow movement of said movable member, an operator controlled vehicle steering member, an operative connection between said steering member and a point on said lever intermediate its ends, a lost motion mounting for holding the other end of said lever relative to said vehicle, means for supplying fluid to and away from said motor including a pump and a pressure pipe leading therefrom and two passageways leading respectively to opposite sides of said piston member and a discharge pipe and a valve for selectively connecting one of said passageways to said pressure pipe while connecting the other of said passageways to said discharge pipe, an operative connection from said other end of said lever to said valve to select the desired position of said valve, a by-pass connecting said pressure pipe and said discharge pipe, and a valve in said by-pass permitting flow from said discharge pipe to said pressure pipe only.

9. Steering means for a vehicle having steerable wheel means, comprising a motor having cylinder and piston members one of which is movable, connecting means between said movable member and said steerable wheel means, a lever, an operative connection between said movable member and one end of said lever for moving said one end to follow movement of said movable member, an operator controlled vehicle steering member, an operative connection between said steering member and a point on said lever intermediate its ends, a lost motion mounting for holding the other end of said lever relative to said vehicle, means for supplying fluid to and away from said motor including a pump and a pressure pipe leading therefrom and two passageways leading respectively to opposite sides of said piston member and a discharge pipe and a valve for selectively connecting one of said passageways to said pressure pipe while connecting the other of said passageways to said discharge pipe, an operative connection from said other end of said lever to said valve to select the desired position of said valve, a fluid operated device connected with said discharge pipe, and said valve having a neutral position permitting flow from said pressure pipe directly to said discharge pipe, whereby said device may be operated in all positions of said valve.

10. Steering means for a vehicle having steerable wheel means, comprising a motor having cylinder and piston members one of which is movable, connecting means between said movable member and said steerable wheel means, a lever, an operative connection between said movable member and one end of said lever for moving said one end to follow movement of said movable member, an operator controlled vehicle steering member, an operative connection between said steering member and a point on said lever intermediate its ends, a lost motion mounting for holding the other end of said lever relative to said vehicle, means for supplying fluid to and away from said motor including a pump and a pressure pipe leading therefrom and two passageways leading respectively to opposite sides of said piston member and a discharge pipe and a valve for selectively connecting one of said passageways to said pressure pipe while connecting the other of said passageways to said discharge pipe, an operative connection from said other end of said lever to said valve to select the desired position of said valve, a fluid operated device connected with said discharge pipe, a by-pass connecting said pressure pipe and said discharge pipe, a valve in said by-pass permitting flow from said pressure pipe to said discharge pipe only, means biasing said valve closed against fluid pressure sufficient for normal operation of said motor, and said first named valve having a neutral position permitting flow from said pressure pipe directly to said discharge pipe, whereby said device may be operated under all conditions.

11. Steering means for a vehicle having steerable wheel means, comprising a motor having cylinder and piston members one of which is movable, means operatively connecting said movable member and said steerable wheel means for causing movement of the latter responsive to movement of the former, means for conducting fluid to and away from said motor including a pump and a pressure pipe leading therefrom and two passageways leading respectively to opposite sides of said piston member and a discharge pipe and a valve having two operating positions in each of which it selectively connects one of said passageways to said pressure pipe while connecting the other of said passageways to said discharge pipe, said valve having a neutral position between its operative positions, an operator controlled vehicle steering member, an operative connection between said steering member and said valve, mechanism connected with said valve and with said movable motor member for automatically returning said valve to neutral position by motor movement, a by-pass connecting said pressure pipe and said discharge pipe, and a valve in said by-pass permitting flow from said discharge pipe to said pressure pipe only.

12. Steering means for a vehicle having steerable wheel means, comprising a motor having cylinder and piston members one of which is movable, means operatively connecting said movable member and said steerable wheel means for causing movement of the latter responsive to movement of the former, means for conducting fluid to and away from said motor including a pump and a pressure pipe leading therefrom and two passageways leading respectively to opposite sides of said piston member and a discharge pipe and a valve having two operating positions in each of which it selectively connects one of said passageways to said pressure pipe while connecting the other of said passageways to said discharge pipe, said valve having a neutral position between its operative positions, an operator controlled vehicle steering member, an operative connection between said steering member and said valve, mechanism connected with said valve and with said movable motor member for automatically returning said valve to neutral position by motor movement, a fluid operated device connected with said discharge pipe, and said valve in its neutral position permitting flow from said pressure pipe directly to said discharge pipe, whereby said device may be operated in all positions of said valve.

13. Steering means for a vehicle having steerable wheel means, comprising a motor having cylinder and piston members one of which is movable, means operatively connecting said movable member and said steerable wheel means for causing movement of the latter responsive to movement of the former, means for conducting fluid to and away from said motor including a pump and a pressure pipe leading therefrom and two passageways leading respectively to opposite sides of said piston member and a discharge pipe and a valve having two operating positions in each of which it selectively connects one of said passageways to said pressure pipe while connecting the other of said passageways to said discharge pipe, said valve having a neutral position between its operative positions, an operator controlled vehicle steering member, an operative connection between said steering member and said valve, mechanism connected with said valve and with said movable motor member for automatically returning said valve to neutral position by motor movement, a fluid operated device connected with said discharge pipe, a by-pass connecting said pressure pipe and said discharge pipe, a valve in said by-pass permitting flow from said pressure pipe to said discharge pipe only, means biasing said valve closed against fluid pressure sufficient for normal operation of said motor, and said first named valve in its neutral position permitting flow from said pressure pipe directly to said discharge pipe, whereby said device may be operated under all conditions.

14. A self-contained unitary power operating system for a vehicle having a steering member and a power operated member, comprising first and second cylinder and piston motor means, an operating connection from one of said motor means to said steering member, an operating connection from the other of said motor means to said power operated member, a pump, a valved pressure fluid conduit connection from the discharge side of said pump to one face of a piston of said first motor means, a valved pressure fluid conduit connection from the other face of the said piston of said first motor means to one face of a piston of said second motor means, and a fluid connection from the other face of the said piston of said second motor means to the intake side of said pump.

GEORGE E. ARMINGTON.